Sept. 25, 1956  J. ASHLEY  2,764,364
ROLL FILM REWINDER

Filed June 24, 1954  2 Sheets-Sheet 1

INVENTOR.
JOANNE ASHLEY
BY
*F. P. Keiper*
ATTORNEY

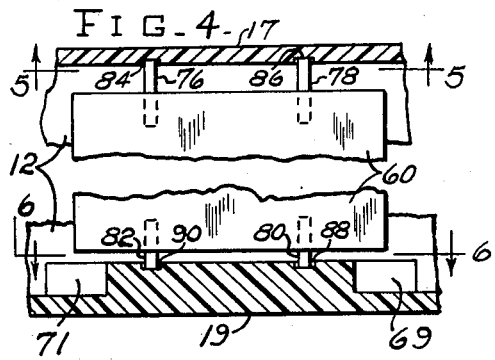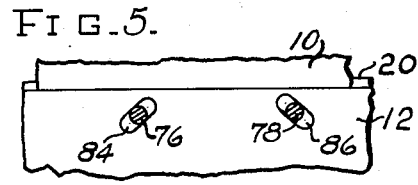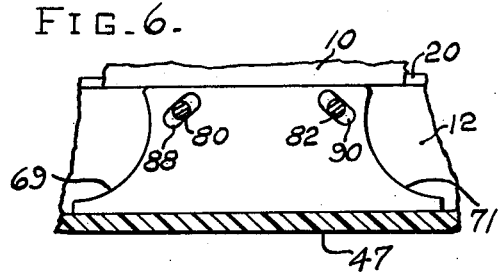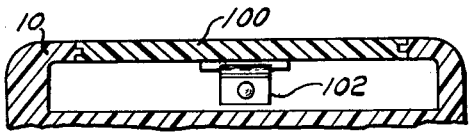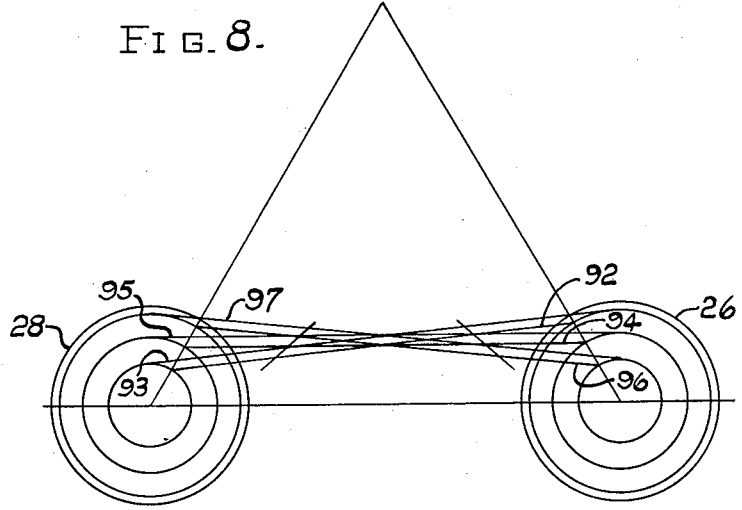

United States Patent Office 2,764,364
Patented Sept. 25, 1956

2,764,364

ROLL FILM REWINDER

Joanne Ashley, Fayetteville, N. Y.

Application June 24, 1954, Serial No. 439,002

6 Claims. (Cl. 242—71)

This invention relates to roll film photography and more particularly to apparatus for rewinding partially exposed film to a new spool for reloading in a camera for exposing the remainder of the film.

In roll film photography, it is often desired to remove a film from the camera before all the exposures have been made in order to reload the camera with a different type of film such as color film. In order to change the film, it is necessary to roll up the unexposed portion of the film upon a spool within the camera, in the same manner as is normally done when all exposures have been made. When rolled up, the film is then removed from the camera. When it is desired to quickly change the film in a camera and there are still unexposed portions remaining, it has often been the practice to remove the film and waste the unexposed portion of the film because of the unavailability of apparatus capable of rerolling the film back upon a spool so that the film could be subsequently reloaded in the camera. The difficulty of rerolling is increased because the paper wrapper and the film are separate, and the film relatively stiff, as compared to the wrapper, and the two may become separated in attempting to start the reroll operation.

The present invention is directed to a portable light tight casing adapted to receive a partially exposed film wound in the usual manner upon a spool, having provision for winding the film back upon an original spool so that the film may be subsequently reloaded in a camera to permit the exposure of the unused portion thereof.

The invention further has to do with providing tension devices within such a casing adapted to engage the film as it is being unrolled from one spool and rolled on the other, so that proper tension will be effected at all times, and the film rerolled in a tight manner whereby to avoid possible spoilage, due to exposure. Further, the invention has to do with providing mechanism for assisting the film to follow the wrapper as both are withdrawn together from the roll preparatory to rerolling, and providing means tending to block any attempt of the film to hug the roll and fail to follow the wrapper. Still further, the invention provides for manually reversing the reroll operation should the film miscarry and separate from the wrapper, following which the reroll operation can again be initiated.

The invention further has to do with the provision of a compact handy case in which the foregoing operation may be performed with safety in daylight, the case being adapted to be manufactured without great expense, and the case further having provision for storing accessories useful in connection with the operation referred to.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 4 is a fragmentary sectional view taken approximately on the line 4—4 of Figure 2;

Figure 5 is a fragmentary sectional view taken substantially on the line 5—5 of Figure 4;

Figure 6 is a fragmentary sectional view taken substantially on the line 6—6 of Figure 4;

Figure 7 is a fragmentary sectional view taken substantially on the line 7—7 of Figure 2; and Figure 8 is a diagrammatic view showing the method of determining the manner of restraining the movement of the pressure plate within the case.

Figure 1:
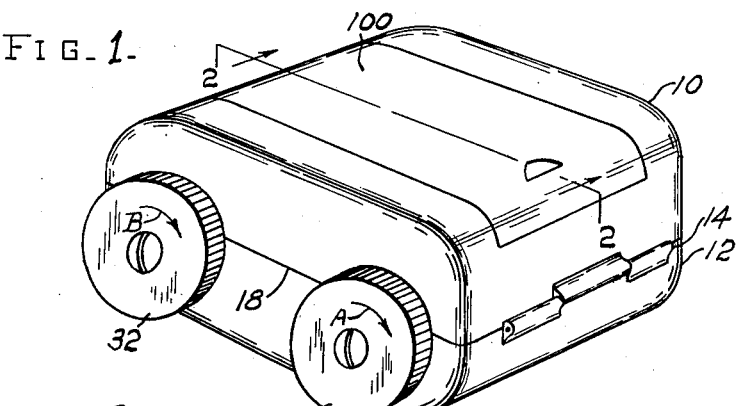
Figure 1 is a perspective view of the roll film rewinder case.
Figure 2:
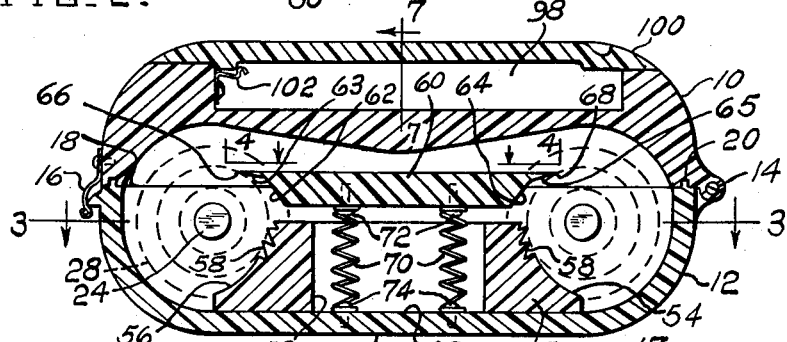
Figure 2 is a sectional view through the case taken substantially on the plane 2—2 of Figure 1.
Figure 3:
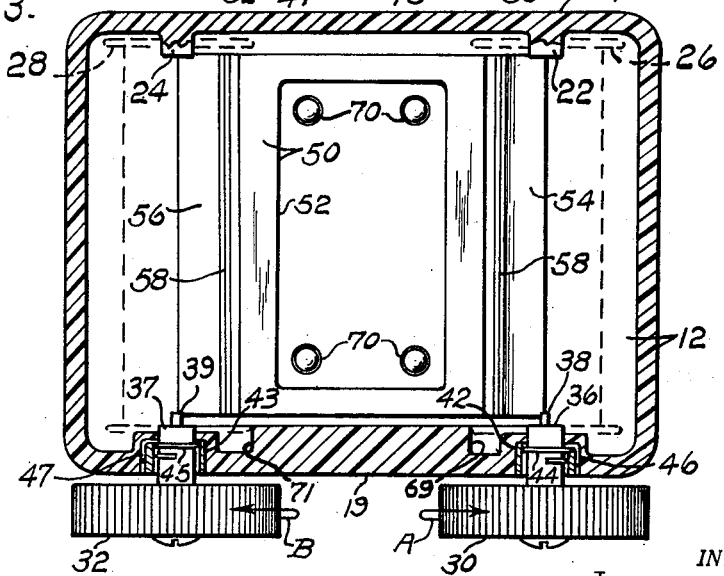
Figure 3 is a sectional view taken substantially on the line 3—3 of Figure 2.

In the drawings, there is shown a casing comprising a top or cover section 10 and bottom section 12 hinged together at one end as at 14, and provided with a clamp for holding the sections closed as shown at 16. The casing sections, along the parting line 18 are provided with a complementary tongue and groove light seal 20, so that film being rerolled within the case will not be endangered to exposure.

One side wall 17 of the lower case member is provided within inwardly projecting bosses 22 and 24, suitably spaced to receive the ends of roll film spools, indicated in dotted line at 26 and 28, such spools being adapted to journal at one end on the bosses. On the opposite side wall 19, there are also provided manually actuated devices such as knurled knobs 30 and 32 mounted upon stub shafts 36 and 37 projecting through the casing side wall in alignment with said bosses 22 and 24. The inner ends of the stub shafts are provided with transverse keys 38 and 39 adapted to nest in the transverse slot normally provided in one end of standard roll film spools, as will be well understood in the art. Each of the stub shafts 36 and 37 is journalled in the casing wall 19 and extends through metallic sleeves 42 and 43 surrounding the stub shafts 36 and 37 in spaced relation, such sleeves being embedded in the casing wall.

The annular spaces thereby provided contain one or more turns of coil springs 44 and 45, the ends 46 and 47 of which extend radially away from the respective stub shafts 36 and 37 and are anchored between the respective sleeves 42 and 43 and the casing wall.

Each of said coil springs acts as a one way brake and prevents rotation of its respective control shaft in one direction, while permitting free rotation in the direction indicated by the arrows A and B. Each of the stub shafts 36 and 37 may be moved axially to engage or disengage the transverse keys 38 and 39 with the slotted ends of the respective film spools. The coil spring 44 associated with the shaft 36 allows rotation of such shaft in the direction of the arrow A, while the coil spring 45 in connection with the shaft 37 permits rotation of such shaft in the opposite direction, as indicated by the arrow B. When the stub shafts 36 and 37 are disengaged, the end flanges of the spools 26 and 28 journal in their respective circular recesses 69 and 71 in the side wall 19.

The bottom wall 47 of the lower casing section is provided with a flat surface 48 upon which is slidably disposed a sliding pressure plate 50, such plate being in the form of a block having a central rectangular opening 52 therein, and arcuate end faces 54 and 56 adapted to engage the turns of the film wrapper upon spools contained within the casing. Such arcuate end faces 54 and 56 are further provided with transverse projections such as 58, which make line contact with the film wrapper upon the respective spools and act to prevent the film and wrapper rolled upon the spool from uncoiling except as is essential in the transfer of the film from one spool to the other. The block is free to slide away from one spool toward the other to compensate for the removal of turns from one spool and the accumulation of turns on the other.

A further pressure plate 60 is provided within the casing and is adapted to resiliently bear upon the film wrapper upon each of the spools along an elemental line immediately adjacent the point at which the film and wrapper is leaving the roll, or approaching the roll as the case may be. Such plate is provided with a compound bevel as at 62 and 63, and 64 and 65 to provide clearance and strength and to provide lineal pressure upon the rolls along lines 66 and 68. The plate is resiliently tensioned downward against the rolled film and wrapper of both spools by tension springs 70, the springs being secured to the plate 60 by any suitable fastening means as at 72, and to the bottom 47 by further fastening means such as 74. To render the pressure exerted by such plate as uniform as possible, four such springs are employed, such springs extending through the rectangular aperture 52 of the sliding block or pressure plate 50. Suitable means are provided to confine the movement of the resilient pressure plate 60 as it necessarily rocks and shifts, in response to variation in the number of layers of rolled material on the respective spools. Such means consist of opposed pins 76, 78, 80 and 82 riding in inclined slots 84, 86, 88 and 90 respectively, in the opposite side walls of the lower casing member. Such slots are so inclined as to confine the movement of the plate so that its point of contact along lines 66 and 68 at opposite ends with the rolled film on each of the spools, will always be immediately adjacent to the point at which the film tangentially leaves one roll and tangentially approaches the other roll.

To arrive at such inclination as will produce the desired effect, reference is had to the diagram of Figure 8. The point of contact of the ends or line contact of the pressure plate 60 upon the film and wrapper is preferably determined to lie at about 60° away from the tangential point at which the film and wrapper leaves or approaches, as the case may be, the respective spool. In the diagram, the lines 92, 94 and 96 represent the length of the top surface of the pressure plate 60, between the end contact edges or lines 66 and 68, the line 92 indicating the lay of the plate when the spool 26 is full, and the spool 28 is empty, the line 94 indicating the lay of the plate when the spools are about equally filled, and the line 96 indicating the lay of the plate when spool 26 is substantially empty and the spool 28 filled. Also in the diagram, the line 93 represents the common tangent to both rolls when roll 26 is full and roll 28 is empty, while lines 95 and 97 indicate the corresponding status when the pressure plate 60 lies along the lines 94 and 96 respectively. The lines 93, 95 and 97 generally indicate the path of travel of film and wrapper from one roll to the other, and the section of film and wrapper lying between the rolls may be referred to as the reach portion.

The pins 76, 78, 80, and 82 of the pressure plate are disposed at one half the distance from the plate center to either end 66 or 68 thereof, and from the diagram, it will be apparent that the angle and length of the slots 84, 86, 88, and 90, which will be required to confine the movement of the plate, so as to maintain such plate in effective position in respect to both rolls, can be readily determined, and when so determined the movement of the plate will be confined so as to bear on the rolls in the manner indicated regardless of variation in the number of layers of film upon the rolls.

It will be understood by those skilled in the art, that the paper wrapper accompanying the film is extended in length at either end so as to provide a plurality of wraps thereof when the film and wrapper are rolled on one spool or the other, the extra length being determined by the number of turns required to afford absolute safety against exposure of the film.

It will thus be seen that the pressure plate resiliently bears upon the uncoiled film of each roll at the point most advantageous for preventing uncoiling of the film and thus eliminates all tendency of the inner or outer turns of the film to coil loosely upon the spool to which the film is being transferred.

In practice, the rolled film and wrapper coiled upon a spool will be placed upon the boss 22 and in the position of roll 26. The end of the wrapper will then be drawn across the pressure plate 60 and attached to the rewind spool 28, by threading the end through the spool drum slit as is well understood in the art.

The casing cover is then closed and rewinding is then effected by sliding the rewinding shaft 37 inwardly so as to engage its key 39 with the spool end slot, after which the spool is rotated in the direction of arrow B, it being understood that the shaft 36 during such operation is axially withdrawn from engagement with the end of spool 26 to allow the spool to rotate freely.

After several turns of the spool 28, the end of the film on spool 26 will commence to unwind with the wrapper, and the wrapper and film together will be drawn across the outer face of the resilient pressure plate 60. While the end of the film may attempt to travel around the spool 26 and not carry with the wrapper, the angular edge 68 of the pressure plate will be effective to part the leading edge of the film from the roll and thereby cause the film to carry with the wrapper. Should the film for any reason fail to be separated from the roll by the edge 68, the transverse angularly upwardly projecting edges 58 of the block 50 will engage the leading edge of the film, and tend to block the further unrolling operation.

If for any reason, during the rewinding operation, resistance is met which might be caused by the leading edge of the film failing to carry along with the wrapper, the film may be wound backwardly by axially shifting the shaft 36 into engagement with the spool 26 while disengaging the shaft 37 from the spool 28, so that the leading edge of the film will be retracted and thereby be placed in a position so that on subsequent reversal, the edge 68 of the plate 60 will again have the opportunity to separate the film from the roll and cause the film to carry with the wrapper across the upper surface of the pressure plate 60. It will be understood that the rewind knobs 30 and 32 will be restored to their former position for rewinding, whereupon the rewinding may continue, until all of the film and wrapper are wound on the spool 28.

It will be understood that as soon as the film is rewound upon the spool 28, the cover may be opened, the spool 28 removed with the film rolled thereon, the spool and roll being ready for reloading into the camera. It will be desirable to label such roll with the number of frames which have been exposed, so that when it is reloaded into a camera, the exposed frames will be quickly passed over so that the first frame of the unexposed portion of the film can be immediately placed in position for exposure, following which the film is advanced after each exposure in the normal manner.

The cover section of the casing is provided with a cavity 98 having a slide door 100 which is held in closed position by a spring detent 102. Such cavity may be used to store labels and marking devices, so that upon rewinding a particular film, the roll can promptly be provided with a suitable notation as to the number of frames exposed or the first unexposed frame of the film roll.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A roll film rewinder comprising a casing, means within said casing for supporting a film spool at each end thereof in spaced parallel relation, means external of the casing and extending through a side wall thereof for rotating one spool in one direction and the other oppositely; a floating pressure plate within the casing adapted to lie below a reach of film extending between said spools and to bridge the distance between said spools and simultaneously bear upon film contained on said spools beneath said reach, resilient means for tensioning said plate toward said spools, means to confine the movement of said pressure plate to compensate for variation in the number of turns of film on each spool, and a sliding block below said pressure plate having end faces adapted to oppositely bear against the turns of film on said spools, said block being adapted to slide to compensate for variations in the number of turns on the respective spools.

2. A roll film rewinder for undeveloped photographic roll film composed of a sensitized film, and an extended wrapper therefor comprising a casing, means within said casing for supporting a film spool at each end thereof in spaced parallel relation, means external of the casing and extending through a side wall thereof for rotating one spool in one direction and the other oppositely; a floating pressure plate within the casing adapted to lie below a reach of film extending between said spools and to bridge the distance between said spools and simultaneously bear upon film contained on said spools beneath said reach, said plate having a wedge-shaped end terminating in an edge adapted to separate an end of film, from the wrapper of the adjacent next turn and resilient means for tensioning said plate toward said spools.

3. A roll film rewinder comprising a casing, means within said casing for supporting a film spool at each end thereof in spaced parallel relation, means external of the casing and extending through a side wall thereof for rotating one spool in one direction and the other oppositely; a floating pressure plate within the casing adapted to lie below a reach of film extending between said spools and to bridge the distance between said spools and simultaneously bear upon film contained on said spools beneath said reach, resilient means for tensioning said plate toward said spools, and a sliding block below said pressure plate having end faces adapted to oppositely bear against the turns of film on said spools, said block being adapted to slide to compensate for variations in the number of turns on the respective spools.

4. A roll film rewinder comprising a casing, means within said casing for supporting a film spool at each end thereof in spaced parallel relation, means external of the casing and extending through a side wall thereof for rotating one spool in one direction and the other oppositely, a block having end faces adapted to oppositely simultaneously bear against the turns of film on said spools, and a guide plate adapted to resiliently contact the outer turns of film on said rolls, along lines immediately beneath a reach of film extending between said rolls.

5. A rewinder for undeveloped photographic roll film of the type having a sensitized film and an extended wrapper, comprising a casing, means within said casing for supporting a film spool at each end thereof in spaced parallel relation, means external of the casing and extending through a side wall thereof for engaging and disengaging said spools and for rotating one spool in one direction and the other oppositely and a floating pressure plate within the casing adapted to lie below a reach of film or wrapper extending between said spools and to bridge the distance between said spools and simultaneously bear upon film wrapper contained on said spools underneath said reach, said pressure plate having a smooth upper surface and at least one end edge beveled on the underside to provide a wedge-shaped end terminating in an edge for contacting the wrapper of film on a roll from which film is to be unrolled at a point beneath said reach to separate the film end from the roll and separate the film end from the wrapper of the next turn, whereby to guide the sensitized film end across the plate with the wrapper.

6. A rewinder for photographic roll film of the type having a sensitized film and an extended wrapper, comprising a casing, means within said casing for supporting a film spool at each end thereof in spaced parallel relation, means external of the casing and extending through a side wall thereof for engaging and disengaging said spools and for rotating one spool in one direction and the other oppositely, a floating pressure plate within the casing adapted to lie below a reach of film or wrapper extending between said spools and to bridge the distance between said spools and simultaneously bear upon film wrapper contained on said spools underneath said reach, said pressure plate having a smooth upper surface and at least one end edge beveled on the underside for contacting the wrapper of film on a roll from which film is to be unrolled at a point beneath said reach, whereby to guide the sensitized film across the plate with the wrapper, and means bearing against said roll having a recess facing upward toward said reach for engaging a sensitized film end failing to follow the wrapper across the plate.

References Cited in the file of this patent

UNITED STATES PATENTS

| 2,137,601 | Abrams | Nov. 22, 1938 |
| 2,173,996 | Becker | Sept. 26, 1939 |
| 2,195,268 | Cazes | Mar. 26, 1940 |
| 2,353,044 | Kriegsheim | July 4, 1944 |